United States Patent [19]

Kageyama et al.

[11] Patent Number: 5,510,400
[45] Date of Patent: Apr. 23, 1996

[54] CATIONIC ELECTRODEPOSITION COATING COMPOSITION

[75] Inventors: Hiroyuki Kageyama, Itami; Tatsuo Yoshida, Kyoto; Yoshio Kojima, Nara, all of Japan

[73] Assignee: Nippon Paint Co., Ltd., Osaka, Japan

[21] Appl. No.: 332,077

[22] Filed: Nov. 1, 1994

[30] Foreign Application Priority Data

Nov. 2, 1993 [JP] Japan ................................ 5-274208

[51] Int. Cl.$^6$ .............................. C08L 63/02; C09D 5/44
[52] U.S. Cl. .......................... 523/404; 204/503; 204/505; 523/415
[58] Field of Search ............................. 204/181.7, 181.4; 523/415, 404

[56] References Cited

U.S. PATENT DOCUMENTS

| | | | |
|---|---|---|---|
| 4,017,438 | 4/1977 | Jerabek et al. | 523/415 |
| 5,401,782 | 3/1995 | Kawakami et al. | 204/181.4 |

FOREIGN PATENT DOCUMENTS

| | | |
|---|---|---|
| 192113 | 8/1986 | Australia . |
| 0118743 | 9/1984 | European Pat. Off. . |
| 0261679 | 3/1988 | European Pat. Off. . |
| 3519953 | 12/1986 | Germany . |
| 1449839 | 9/1976 | United Kingdom . |
| 91 05086 | 4/1991 | WIPO . |

*Primary Examiner*—John Niebling
*Assistant Examiner*—Kishor Mayekar
*Attorney, Agent, or Firm*—Wenderoth, Lind & Ponack

[57] ABSTRACT

The present invention provides a cationic electrodeposition coating composition which satisfies both stability of paint with time and corrosion resistance when baked at low-temperature. A cationic electrodeposition coating composition comprises:

(A) a cationic resin;
(B) a low-temperature dissociation type block isocyanate curing agent; and
(C) a pigment paste containing a pigment dispersed in a cationic pigment dispersing resin, wherein said cationic pigment grinding resin is prepared by introducing primary amino groups into a hydrophobic resin for pigment dispersion and neutralizing with acid, said hydrophobic resin has an SP value of 10.0 to 11.0, number of amino groups in one molecule is average 1.6 to 4.0, and a weight ratio of component A:B:C is 10 to 88:10 to 50:2 to 50.

6 Claims, No Drawings

CATIONIC ELECTRODEPOSITION COATING COMPOSITION

FIELD OF THE INVENTION

The present invention relates to a cationic electrodeposition coating composition. More particularly, it relates to a cationic electrodeposition coating composition which satisfies both corrosion resistance when baked at low-temperature, and pigment dispersion stability.

BACKGROUND OF THE INVENTION

A cationic electrodeposition coating composition providing a corrosion-resistant coating to articles to be coated such as automobiles, etc. is an aqueous dispersion which is prepared by dispersing a cationic resin, a curing agent, and a pigment paste containing a pigment dispersed in a pigment dispersing resin, in an aqueous medium. The cationic electrodeposition coating composition is electrocoated on an article and then baked at a temperature of more than 160° C. to cure the coated film on the article.

Recently, in order to reduce energy cost, it has been requested for the above cationic electrodeposition coating composition to be baked at a relatively low temperature (i.e. less than 160° C.) for a short period of time. On the other hand, it is necessary that the cationic electrodeposition coating composition has pigment dispersion stability, as a matter of course. It is difficult to satisfy both these two performances in the prior art.

For example, when using a resin containing a quaternary ammonium salt as the cationic pigment dispersing resin, the resulting coating composition is superior in pigment dispersion stability, but corrosion resistance is not sufficient when baked at a low-temperature of 160° C. or less.

It is also suggested that a tertiary sulfonium salt is used as the cationic pigment dispersing resin. When using this cationic pigment dispersing resin, the resulting coating composition is superior in corrosion resistance when baked at the low-temperature but is inferior in pigment dispersion stability, and stability of the paint bath is not sufficient.

Further, there is also suggested a pigment dispersing resin which contains a tertiary amine salt neutralized with acid, but it has the same disadvantage as that of the cationic pigment dispersing resin containing the above sulfonium salt.

OBJECTS OF THE INVENTION

The main object of the present invention is to provide a cationic electrodeposition coating composition which satisfies both pigment dispersion stability and corrosion resistance when cured at a low temperature of 160° C. or less.

This object as well as other objects and advantages of the present invention will become apparent to those skilled in the art from the following description.

SUMMARY OF THE INVENTION

That is, the present invention provides a cationic electrodeposition coating composition comprising:
(A) a cationic resin;
(B) a low-temperature dissociation type block isocyanate curing agent; and
(C) a pigment paste containing a pigment dispersed in a cationic pigment dispersing resin,
wherein said cationic pigment grinding resin is prepared by introducing primary amino groups into a hydrophobic resin for pigment dispersion and neutralizing with acid, said hydrophobic resin has an SP value of 10.0 to 11.0, number of amino groups in one molecule is average 1.6 to 4.0, and a weight ratio of Component A:B:C is 10 to 88:10 to 50:2 to 50.

DETAILED DESCRIPTION OF THE INVENTION

The cationic resin which can be used in the present invention may be any cationic resin which has hitherto been known. Examples thereof include amine-modified epoxy resins described in U.S. Pat. Nos. 4,007,154 and 4,104,147, amine-modified polyurethane polyol resins described in U.S. Pat. No. 4,285,789, amine-modified polybutadiene resins described in U.S. Pat. No. 4,370,453 and EP-A-262,772, amine-modified acrylic resins described in Japanese Laid-Open Patent Publication No. 63-139909 and Japanese Patent Publication No. 1-60516 and the like. Sulfonium group-containing reins and phosphonium group-containing reins are also known and can be used for the cationic resin. Preferable cationic resins are amine-modified epoxy resins.

The cationic resin (A) may be formulated in an amount of 10 to 88% by weight, preferably 30 to 70% by weight, based on the solid content of the coating composition. When the amount exceeds 88% by weight, curing properties is insufficient. On the other hand, when the amount is smaller than 10% by weight, rust prevention performances are deteriorated.

The cationic electrodeposition coating composition of the present invention contains a blocked polyisocyanate (B) having a dissociation temperature of 100° to 160° C., which is thus unblocked at a temperature of 100° to 160° C. to generate isocyanate groups. The blocked polyisocyanate (B) may be present as separate component or be integrate to the other component. For example, a half-blocked polyisocyanate is reacted with the cationic resin (A) to give crosslinking function to the cationic resin (A). When containing no blocked polyisocyanate, the resulting coating composition has poor curing properties. When the dissociation temperature is lower than 100° C., fluidity of the coating is extremely inferior, which results in deterioration of smoothness of a plane section. There is also a problem about stability of paint. On the other hand, when the dissociation temperature exceeds 160° C., the resulting coating composition has poor curing properties at the time of low-temperature baking and the corrosion resistance is deteriorated.

As the blocked polyisocyanate having a dissociation temperature of 100° to 160° C., there can be used all polyisocyanates which have hitherto been used as a vehicle component for electrodeposition paint, but it is necessary to select a blocking agent for the low-temperature curing. Typical examples of polyisocyanates include aliphatic diisocyanates, such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, etc.; alicyclic diisocyantes, such as 1,3-cyclopentane diisocyanate, 1,4-cyclohexane diisocyanate, 1,2-cyclohexane diisocyanate, isophorone diisocyanate, etc.; aromatic diisocyanates such as m-phenylene diisocyanate, p-phenylene diisocyanate, 4,4'-diphenyl diisocyanate, 1,5-naphthalene diisocyanate, 1,4-naphthalene diisocyanate, etc.; aliphatic-aromatic diisocyanates such as 4,4'-diphenylmethane diisocyanate, 2,4- or 2,6-toluene diisocyanate or a mixture thereof, 4,4'-toluidine diisocyanate, 1,4-xylene diisocyanate, etc.; nuclear substitution aromatic diisocyanates such as dianisidine diisocyanate, 4,4'-diphenyl ether diisocyanate, chlorodiphenyl diisocyanate, etc.; triisocyanates such as triphenylmethane- 4,4',4"-triisocyanate, 1,3,5-triisocyanate benzene, 2,4,6-triisocyanate toluene, etc.; tetraisocyanates such as 4,4'-diphenyl-dimethylmethane- 2,2',5,5'-tetraisocyanate, etc.; polymerized polyisocyanates such as toluene diisocyanate dimer, toluene diisocyanate trimer, etc.

The blocking agent has to be selected to dissociate (or unblocked) at a temperature of 100° to 160° C. and the dissociation may be conducted in the presence of a catalyst. In case of aromatic polyisocyanates, examples of the blocking agent include halogenated hydrocarbons such as 1-chloro- 2-propanol, ethylene chlorohydrin, etc.; aliphatic or heterocyclic alcohols such as n-propanol, furfuryl alcohol, alkyl group-substituted furfuryl alcohol, etc.; phenols such as phenol, m-cresol, p-nitrophenol, p-chlorophenol, nonyl phenol, etc.; oximes such as methyl ethyl ketone oxime, methyl isobutyl ketone oxime, acetone oxime, cyclohexane oxime, etc.; active methylene compounds such as acetyl acetone, ethyl acetoacetate, ethyl malonate, etc.; caprolactam, etc. Particularly preferred blocking agents are oximes, phenols and alcohols (e.g. furfuryl alcohol and alkyl group-substituted furfuryl alcohol). In case of aliphatic polyisocyanates, phenols and oximes are preferred.

When using the dissociation catalyst of the blocked polyisocyanate curing agent (B), there can be used organic tin compounds such as dibutyltin laurate, dibutyltin oxide, dioctyltin, etc.; amines such as N-methyl morpholine, etc.; metal salts such as lead acetate, strontium salt, cobalt salt, copper salt, etc. The concentration of the catalyst is normally 0.1 to 6 % by weight, based on the solid content of the film-forming components in the cationic electrodeposition coating composition.

The amount of the blocked polyisocyanate curing agent (B) into the composition may be 10 to 50% by weight, preferably 15 to 40% by weight, based on the solid content of the coating composition. When the amount is smaller than 10% by weight, the resulting coating composition has poor curing properties. On the other hand, when the amount exceeds 50% by weight, a large amount of the eliminated product is generated at the time of baking of coating and, thereby causing problems such as deterioration of smoothness of the coating, generation of environmental pollution due to a large amount of resin, smoke, etc.

The cationic pigment dispersing resin used for the pigment paste of the present invention is prepared by introducing primary amino groups into a hydrophobic resin for pigment dispersion and neutralizing with acid. The hydrophobic resin has an SP value of 10.0 to 11.0 and number of amino groups in one molecule is average 1.6 to 4.0.

Most preferable cationic pigment dispersing resin used for the present invention is one which is obtained by introducing a primary amine group into a hydrophobic epoxy resin prepared by reacting a bisphenol A type epoxy resin with isocyanate, the amount of a residue of said isocyanate in one molecule being 1.0 to 0.5 molar equivalent.

The epoxy resin used for the present invention is normally polyepoxide. This polyepoxide normally contains one or more 1,2-epoxy groups in one molecule. It is preferred that the polyepoxide has an epoxy equivalent of 180 to 1,000, particularly 375 to 800. When the epoxy equivalent is smaller than 180, no film can be formed at the time of electrodeposition, thereby affording no coating. When it exceeds 1,000, the amount of the cation group in one molecule is insufficient, thereby affording insufficient water-solubility.

Examples of the useful polyepoxide include polyglycidyl ether of polyphenol (e.g. bisphenol A). This polyepoxide can be prepared, for example, by etherifying a polyphenol with epichlorohydrin or dichlorohydrin in the presence of alkali. The polyphenol may be bis(4-hydroxyphenyl)-2,2-propane, 4,4'-dihydroxybenzophenone, bis(4-hydroxyphenyl)-1,1-ethane or the like.

The isocyanate used in this invention for reacting with the above epoxy resin may be any isocyanate wherein the amount of a residue of said isocyanate in one molecule is 1.0 to 0.5 molar equivalent, which can adjust the SP value of a hydrophobic epoxy resin produced by reacting with an epoxy resin within a range from 10.0 to 11.0, and it is not specifically limited. The introduction of isocyanate group makes the epoxy resin more hydrophobic.

Examples of the isocyanate used in the present invention include monoisocyanates such as butyl isocyanate, half-blocked isocyanates prepared by partially blocking organic polyisocyanates, and the like. It is preferred to use the half-blocked isocyanates.

The reaction of forming a half-blocked isocyanate is preferred to conduct cooling to 40° to 50° C. while the blocking agent is added dropwise under stirring, if necessary, in the presence of a tin catalyst. Regarding the reaction proportion of the organic polyisocyanate to the blocking agent, the reaction proportion of the blocking agent can be determined by the stoichiometric calculation so that the amount of the isocyanate residue in one molecule of the resulting half-blocked isocyanate may is 1.0 to 0.5 molar equivalent, preferably 0.99 to 0.80 molar equivalent. When the amount of the isocyanate residue exceeds 1.0 molar equivalent, gelation is likely to be arisen at the time of the reaction with the epoxy resin. When the amount is smaller than 0.5 molar equivalent, the amount of the overall blocked isocyanate which has been remained without reacting with the epoxy resin is increased, thereby inhibiting water-solubility, and it is not preferred.

The organic polyisocyanate which can be used in the present invention may be anyone which contains two or more isocyanate groups in one molecule on the average, and it is not specifically limited. Typical examples thereof include aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, etc.; alicyclic diisocyanates such as 1,3-cyclopentane diisocyanate, 1,4-cyclohexane diisocyanate, 1,2-cyclohexane diisocyanate, isophorone diisocyanate, etc.; aromatic diisocyanates such as m-phenylene diisocyanate, p-phenylene diisocyanate, 4,4'-diphenyl diisocyanate, 1,5-naphthalene diisocyanate, 1,4-naphthalene diisocyanate, etc.; aliphatic-aromatic diisocyanates such as 4,4'-diphenylmethane diisocyanate, 2,4- or 2,6-tolylene diisocyanate or a mixture thereof, 4,4'-toluidine diisocyanate, 1,4-xylene diisocyanate, etc.; nuclear substitution aromatic diisocyanates such as dianisidine diisocyanate, 4,4'-diphenyl ether diisocyanate, chlorodiphenyl diisocyanate, etc.; triisocyanates such as triphenylmethane-4,4', 4"-triisocyanate, 1,3,5-triisocyanate benzene, 2,4,6-triisocyanate toluene, etc.; tetraisocyanates such as 4,4'-diphenyl-dimethylmethane-2,2',5,5'-tetraisocyanate, etc.;

polymerized polyisocyanates such as tolylene diisocyanate dimer and trimer, etc.

The suitable blocking agent for preparing the half-blocked isocyanate is an alkyl monoalcohol containing 4 to 20 carbon atoms. When the number of carbon atoms contained in the blocking agent is smaller than 4, a suitable SP value can not be obtained. On the other hand, when it exceeds 20, the corrosion resistance is deteriorated. Examples of the blocking agent include butyl alcohol, amyl alcohol, hexyl alcohol, 2-ethylhexyl alcohol, heptyl alcohol, octyl alcohol, nonyl alcohol, 3,3,5-trimethyl hexanol, decyl alcohol, lauryl alcohol, stearyl alcohol and the like.

Then, the epoxy resin is reacted with the half-blocked isocyanate to give a hydrophobic epoxy resin. Preferably, the reaction is carried out by maintaining at 140° C. for about one hour. It is preferred that the reaction proportion of the epoxy resin to the half-blocked isocyanate is 1:0.5 to 1:2.5. The reaction is carried out until the isocyanate group substantially disappear by examining using IR (infrared) spectrum.

In this reaction, by bonding a hydroxyl group contained in the epoxy resin with a non-blocked isocyanate group in the half-blocked isocyanate, hydrophobic nature of the epoxy resin is enhanced. Therefore, the resulting pigment-dispersed paste containing a cationic resin as a dispersing agent has dispersion stability. Preferably, this hydrophobic epoxy resin has a SP value of 10.0 to 11.0, more preferably 10.2 to 10.6. The SP value is an index indicating polarity of the resin and it can be measured, for example, using a turbidity method due to water/hexane titration Japanese Laid-Open Patent Publication 5-140489. When the SP value of the hydrophobic epoxy resin exceeds 11.0, the hydrophobic nature of the resin is deteriorated and an interaction between the resin and pigment is inferior and, therefore, the dispersion stability of the pigment-dispersed paste is insufficient. On the other hand, when it is smaller than 10.0, the hydrophobic nature of the resin is inferior, the storage stability as the electrodeposition paint is inferior. The SP value of the hydrophobic epoxy resin can be adjusted by selecting the reaction proportion of the half-blocked isocyanate and the blocking agent for preparing the half-blocked isocyanate.

Then, a primary amino group is introduced in the resulting hydrophobic epoxy resin and neutralized to impart hydrophilic nature. Thereby, there can be obtained an electrodeposition paint which exhibits dispersion and storage stability when the pigment-dispersed paste is diluted with an aqueous medium. In the present invention, the introduction of primary amino group is conducted by reacting a partially ketimine-capped polyamine with the epoxy group in the hydrophobic epoxy resin, and then the ketimine-capped polyamine is uncapped to reproduce primary amino group which is neutralized to make the resin hydrophilic. The partially ketimine-capped polyamine may be prepared by reacting a polyamine compound with a ketone in such an amount ratio that a portion of primary amine groups is capped.

Examples of the polyamine compounds used in the present invention include diethylenetriamine, aminoethylethanolamine, aminoethylpiperazine and the like. The polyamine is reacted with ketone such as acetone, methyl ethyl ketone and methyl isobutyl ketone to give a kerimine-capped polyamine. The ketimine-capped production reaction proceeds easily by heating at 100° C. or more and distilling-off water produced.

The reaction between the ketimine-capped polyamine and the epoxy resin may be carried out at 120° C. for one hour.

The reacting product having ketimine-capped amine groups is cooled to 90° C., to which excessive pure water is added to regenerate primary amino groups.

Number of primary amine groups may be controlled by reacting some of the primary amine groups with an acid anhydride to give amide groups. The amide groups have a little hydrophilic nature by themselves and conceal advantages from the primary amine groups, but give some hydrophilic nature to the resulting resin. The resulting resin preferably has average number of primary amine group of 1.0 to 3.0, more preferably 1.2 to 2.4. The introduction of amide group further improves coating workability without injuring hydrophilic nature. Examples of the acid anhydrides used for introduction of amide group are propionic anhydride, acetic anhydride and the like, with acetic anhydride being preferred. It is preferred that average 1.2 to 2.4 amide groups, more preferably 0.8 to 2.0 amide groups, are present in one molecule.

The pigment paste of the component (C) of the present invention is a mixture of the cationic pigment dispersing resin and a suitable pigment. Examples of the pigment which can be used in the present invention include color pigments such as carbon black, graphite, titanium oxide, zinc white, etc.; extender pigments such as aluminum silicate, kaolin, etc.; synthesized pigments such as strontium chromate, basic lead silicate, basic lead sulfate, aluminum phosphomolybdate, etc. The concentration of the pigment may be 1 to 35% by weight, preferably 10 to 30% by weight, based on the total solid content of the electrodeposition coating composition. The amount of the cationic pigment dispersing resin depends on the amount of the pigment and is 1 to 20% by weight, preferably 1 to 15% by weight, based on the total solid content of the electrodeposition coating composition.

The cationic electrodeposition coating composition of the present invention can contain various additives and solvents, if necessary, in addition to the above components.

Examples of the additive include acids (e.g. formic acid, acetic acid, lactic acid, sulfamic acid, etc.) and surfactants which are used for dispersing the film-forming component in the aqueous medium. The concentration of these additives is 0. 1 to 15% by weigh, preferably 0. 1 to 5% by weight, based on the solid content of the whole electrodeposition coating composition.

The cationic electrodeposition coating composition of the present invention is dispersed in the aqueous medium, and various organic solvents may be used as the aqueous medium in order to dissolve the resin and adjust viscosity, in addition to water. Examples of the solvent which can be used in the present invention include hydrocarbons (e.g. xylene, toluene, etc.), alcohols (e.g. methyl alcohol, n-butyl alcohol, isopropyl alcohol, 2-ethylhexyl alcohol, ethylene glycol, propylene glycol, etc.), ethers (e.g. ethylene glycol monoethyl ether, ethylene glycol monobutyl ether, ethylene glycol monohexyl ether, propylene glycol monoethyl ether, 3-methyl-3-methoxybutanol, diethylene glycol monoethyl ether, diethylene glycol monobutyl ether, etc.), ketones (e.g. methyl isobutyl ketone, cyclohexanone, isophorone, acetylacetone, etc.), esters (e.g. ethylene glycol monoethyl ether acetate, ethylene glycol monobutyl ether acetate, etc.) or a mixture thereof. The amount of the solvent is about 0.01 to 25% by weight, preferably 0.05 to 15% by weight, based on the total weight of the coating composition.

In the present invention, the electrodeposition paint is carried out under the following condition which has normally been used, heretofore:

temperature of a paint: 20° to 40° C.

applied voltage: 50 to 500 V duty time: 30 seconds to 10 minutes at the state where an article to be coated is completely dipped in a paint bath.

The requisite thickness of the electrodeposition coating (baked coating) is 5 to 50 μm, preferably 10 to 35 μm.

In the present invention, the baking of the electrodeposition coating is normally carried out at a temperature of the article to be coated of 100° to 200° C., preferably 130° to 160° C., for 5 to 50 minutes. Even if the baking is carried out at high temperature (more than 160° C.), the corrosion resistance is not deteriorated.

Examples of the metal material which can be used in the process of the present invention include iron, copper, galvanized material, aluminum or an alloy thereof. Further, there can also be used the metal material which has been subjected to a chemical treatment.

As described above, according to the present invention, there is provided a cationic resin which can provides an electrodeposition paint having excellent storage stability and a coat having excellent corrosion resistance.

EXAMPLES

The following Preparation Examples, Examples and Comparative Examples further illustrate the present invention in detail but are not to be construed to limit the scope thereof. In the Preparation Examples, Examples and Comparative Examples, "parts" are by weight unless otherwise stated.

Preparation Example 1 Preparation of Polyurethane Crosslinking Agent A

840 Parts of hexamethylene diisocyanate was charged in a reaction vessel equipped with a stirrer, a cooling tube, a nitrogen introducing tube and a thermometer, and then diluted with 609 parts of methyl isobutyl ketone (hereinafter abbreviated to "MIBK"). Then, 0.9 part of dibutyltin laurate was added thereto and, after heating to 50° C., 223.5 parts of trimethylolpropane (hereinafter abbreviated to "TMP") was added so that the resin temperature might not exceed 60° C. Then, 435 parts of methyl ethyl ketooxime (hereinafter abbreviated to "MEK oxime") was added slowly so that the resin temperature might not exceed 70° C. The mixture was maintained at 70° C. for one hour until an absorption of the isocyanate group substantially disappeared by the measurement of infrared absorption spectrum. Thereafter, the reaction product was diluted with 32 parts of n-butanol (resin solid content: 70.0%).

Preparation Example 2 Preparation of Aminated Epoxy Resin

In a reaction vessel equipped with a stirrer, a cooling tube, a nitrogen introducing tube and a thermometer, 950 parts of bisphenol A type epoxy resin having an epoxy equivalent of 950 (Epototo YD-014, manufactured by Toto Kasei Co., Ltd.) and 237.5 parts of MIBK were heated to 100° C. to dissolve completely. Then, 73.4 parts of a methyl isobutyl-73% MIBK solution of diethylenetriamine and 60.1 parts of n-methyl ethanolamine were added and this mixture was heated to 115° C. and reacted for one hour, and the reaction product was taken out (resin solid content: 80.5%).

Preparation Example 3 Preparation of Water Dispersion A of Main Resin for Cationic Electrodeposition Paint

| Component | Amount (parts by weight) |
| --- | --- |
| Aminated epoxy resin (Preparation Example 2) | 832.3 |
| Polyurethane crosslinking agent A (Preparation Example 1) | 471.4 |
| n-Hexyl cellosolve | 65.0 |
| Glacial acetic acid | 18.5 |
| Deionized water | 1737.8 |

According to the above formulation, an aminated epoxy resin obtained in Preparation Example 2 and a polyurethane crosslinking agent A obtained in Preparation Example 1 were mixed with n-hexyl cellosolve. After neutralizing with glacial acetic acid, deionized water was added to dilute the mixture slowly. Then, the organic solvent was removed under reduced pressure until the solid content is 36.0% to give a water dispersion A of a main resin for cationic electrodeposition paint.

Preparation Example 4 Preparation of Polyurethane Crosslinking Agent B

1110 Parts of isophorone diisocyanate (hereinafter abbreviated to "IPDI") was charged in a reaction vessel equipped with a stirrer, a cooling tube, a nitrogen introducing tube and a thermometer, and isophorone diisocyanate was diluted with 719 parts of MIBK. Then, 1.1 parts of dibutyltin laurate was added and, after heating to 50° C., 223.5 parts of TMP was added slowly so that the resin temperature might not exceed 60° C. Then, 435 parts of MEK oxime was added so that the resin temperature might not exceed 70° C. The mixture was maintained at 70° C. for one hour until the absorption of the isocyanate group substantially disappeared by the measurement of infrared absorption spectrum. Thereafter, the reaction product was diluted with 38 parts of n-butanol (resin solid content: 70.0%).

Preparation Example 5 Preparation of Polycaprolacton Diol Chain-Extended Polyether In a reaction vessel equipped with a stirrer, a cooling tube, a nitrogen introducing tube and a thermometer, 690 parts of a bisphenol A type epoxy resin having an epoxy equivalent of 190 (Epicoat 828, manufactured by Yuka Shell Epoxy Co., Ltd.), 250 parts of polycaprolacton polyol (molecular weight: 500, manufactured by Daiseru Kagaku Kogyo Co., Ltd.), 198 parts of bisphenol A and 59.9 parts of MIBK were reacted at 180° C. for one hour in the presence of 1.5 parts of benzyldimethylamine. Further, 2.2 parts of benzyldimethylamine was added and the reaction was carried out at 150° C. for 4 hours to give a product having an epoxy equivalent of 1100. Then, 137.2 parts of MIBK was added to the product and, after cooling to 100° C., 72.3 parts of a methyl isobutyl diketimine-73% MIBK solution of diethylenetriamine and 59.1 parts of n-methyl ethanolamine were added and this mixture was heated to 115° C. and reacted for one hour. Then, the reaction product was diluted with 132 parts of MIBK to give a resin varnish (resin solid content: 78.0%).

Preparation Example 6 Preparation of Water Dispersion B of Main Resin for Cationic Electrodeposition Paint

| Component | Amount (parts by weight) |
| --- | --- |
| Polycaprolacton diol chain-extended polyether (Preparation Example 5) | 859.0 |
| Polyurethane crosslinking agent B (Preparation Example 4) | 471.4 |
| n-Hexyl cellosolve | 50.0 |
| Glacial acetic acid | 15.5 |
| Deionized water | 1729.1 |

According to the above formulation, polycaprolacton diol chain-extended polyether obtained in Preparation Example 5 and a polyurethane crosslinking agent B obtained in Preparation Example 4 were mixed with n-hexyl cellosolve. After neutralizing with glacial acetic acid, deionized water was added to dilute the mixture slowly. Then, the organic solvent was removed under reduced pressure until the solid content was 36.0% to give a water dispersion B of a main resin for cationic electrodeposition paint.

Preparation Example 7 Preparation of Acrylic Cationic Resin

45 Parts of ethylene glycol monohexyl ether was charged in a reaction vessel equipped with a stirrer, a cooling tube, a nitrogen introducing tube and a thermometer, which was heated to 120° C. To this was added dropwise a mixture of 20 parts of styrene, 30 parts of 2-hydroxyethyl methacrylate, 35 parts of ethyl acrylate, 15 parts of dimethylaminoethyl methacrylate, 3 parts of t-dodecyl mercaptan and 2 parts of azobisisobutyronitrile over 2 hours.

After the completion of dropping, the mixture was maintained at 120° C. for 30 minutes and a mixture of 5 parts of ethylene glycol monohexyl ether and 0.2 part of azobisisobutyronitrile was added dropwise over 5 minutes. Then, the mixture was maintained at 120° C. for one hour to give an acrylic copolymer varnish having a resin solid content of 68.0% and a weight-average molecular weight of about 10,000.

Preparation Example 8 Preparation of Water Dispersion C of Main Resin for Cationic Electrodeposition Paint

| Component | Amount (parts by weight) |
| --- | --- |
| Acrylic cationic resin (Preparation Example 7) | 1176.5 |
| Polyurethane crosslinking agent B (Preparation Example 4) | 285.7 |
| Glacial acetic acid | 17.4 |
| Deionized water | 1298.2 |

According to the above formulation, an acrylic cationic resin obtained in Preparation Example 7 was mixed with a polyurethane crosslinking agent B obtained in Preparation Example 4. After neutralizing with glacial acetic acid, deionized water was added to dilute the mixture slowly to give a water dispersion C of a main resin for cationic electrodeposition paint, wherein the solid content of 36.0%.

Example 1

222.0 Parts of isophorone diisocyanate (hereinafter abbreviated to "IPDI") was charged in a reaction vessel equipped with a stirrer, a cooling tube, a nitrogen introducing tube and a thermometer, and then diluted with 39.1 part of methyl isobutyl ketone (hereinafter abbreviated to "MIBK"). Then, 0.2 parts of dibutyltin laurate was added and, after heating to 50° C., 131.5 parts of 2-ethylhexanol (hereinafter abbreviated to "2EH") was added dropwise with stirring over 2 hours in a dry nitrogen atmosphere. The reaction temperature was maintained at 50° C. by cooling suitably. As a result, 2-ethylhexanol half-blocked IPDI (resin solid content: 90.0%) was obtained.

Then, according to the formulation shown in the following table, Epicoat 828 and bisphenol A were charged in a reaction vessel equipped with a stirrer, a cooling tube, a nitrogen introducing tube and a thermometer. After heating to 130° C. in a nitrogen atmosphere, dimethylbenzylamine was added and the mixture was reacted at 170° C. for one hour under the exothermic reaction to give a bisphenol A type epoxy resin having an epoxy equivalent of 490. After cooling to 140° C., 2-ethylhexanol half-blocked IPDI was added. The mixture was maintained and reacted at 140° C. for one hour to give a hydrophobic epoxy resin having a SP value of 10.6. After diluting with ethylene glycol monobutyl ether, the reaction mixture was cooled to 100° C. and a methyl isobutyl monoketimine-78.8% MIBK solution of aminoethyl ethanolamine was added. This mixture was maintained at 110° C. for one hour and cooled to 90° C. Then, deionized water was added and the mixture was stirred for additional 30 minutes to regenerate the ketiminated primary amino group. Excessive water and MIBK were removed from this mixture under reduced pressure and the residue was diluted with ethylene glycol monobutyl ether to give a pigment-dispersed resin varnish A (resin solid content: 50%).

| Component | Amount (parts by weight) |
| --- | --- |
| Epicoat 828 | 376.0 |
| Bisphenol A | 114.0 |
| Benzyldimethylamine | 0.15 |
| 2-Ethylhexanol half-blocked IPDI | 198.4 |
| Ethylene glycol monobutyl ether | 266.6 |
| Methyl isobutyl monoketimine-78.8% MIBK solution of aminoethyl ethanolamine | 236.0 |
| Deionized water | 360.0 |
| Ethylene glycol monobutyl ether | 486.1 |

The epoxy equivalent of the bisphenol A type epoxy resin used, moles of the half blocked isocyanate added in one molecule, the number of the ketimine group to the epoxy resin and the SP value of the hydrophobic epoxy resin are shown in Table 1 together with the results obtained in

Examples 2 to 7 and Comparative Examples 1 to 4

| Component | Amount (parts by weight) |
| --- | --- |
| Epicoat 828 | 376.0 |
| Bisphenol A | 114.0 |
| Benzyldimethylamine | 0.15 |
| 2-Ethylhexanol half-blocked IPDI | 198.4 |
| Ethylene glycol monobutyl ether | 266.6 |
| Methyl isobutyl diketimine-73% MIBK solution of diethylenetriamine | 367.0 |
| Deionized water | 360.0 |
| Ethylene glycol monobutyl ether | 449.1 |

According to the above formulation, the reaction was conducted under the same reaction condition as that of Example 1 to give a cationic pigment dispersing resin, thereby affording a varnish B for pigment dispersion (resin solid content: 50%).

| Component | Amount (parts by weight) |
| --- | --- |
| Epicoat 828 | 376.0 |
| Bisphenol A | 114.0 |
| Nonylphenol | 44.0 |
| Benzyldimethylamine | 0.15 |
| 2-Ethylhexanol half-blocked IPDI | 396.8 |
| Ethylene glycol monobutyl ether | 323.2 |
| Methyl isobutyl monoketimine-78.3% | 188.8 |
| MIBK solution of aminoethyl ethanolamine | |
| Deionized water | 360.0 |
| Ethylene glycol monobutyl ether | 588.1 |

The reaction was conducted under the same reaction condition as that of Example 1 except that Epicoat 828 and bisphenol A were charged in a reaction vessel equipped with a stirrer, a cooling tube, a nitrogen introducing tube and a thermometer and nonyl phenol was added to give a cationic pigment dispersing resin, thereby affording a varnish C for pigment dispersion (resin solid content: 50%).

Example 4

| Component | Amount (parts by weight) |
| --- | --- |
| Epicoat 828 | 568.9 |
| Bisphenol A | 231.1 |
| Nonyl phenol | 44.0 |
| Benzyldimethylamine | 0.15 |
| 2-Ethylhexanol half-blocked IPDI | 198.4 |
| Ethylene glycol monobutyl ether | 418.3 |
| Methyl isobutyl diketimine-73% | 293.6 |
| MIBK solution of diethylenetriamine | |
| Deionized water | 360.0 |
| Ethylene glycol monobutyl ether | 794.8 |

According to the above formulation, the reaction was conducted under the same reaction condition as that of Example 3 to give a cationic pigment dispersing resin, thereby affording a varnish D for pigment dispersion (resin solid content: 50%).

Example 5

| Component | Amount (parts by weight) |
| --- | --- |
| Epicoat 828 | 376.0 |
| Bisphenol A | 114.0 |
| Nonylphenol | 44.0 |
| Benzyldimethylamine | 0.15 |
| 2-Ethylhexanol half-blocked IPDI | 99.2 |
| Ethylene glycol monobutyl ether | 257.1 |
| Methyl isobutyl diketimine-73% | 293.6 |
| MIBK solution of diethylenetriamine | |
| Deionized water | 360.0 |
| Ethylene glycol monobutyl ether | 591.8 |

According to the above formulation, the reaction was conducted under the same reaction condition as that of Example 3 to give a cationic pigment dispersing resin, thereby affording a varnish E for pigment dispersion (resin solid content: 50%).

Example 6

| Component | Amount (parts by weight) |
| --- | --- |
| Epicoat 828 | 568.9 |
| Bisphenol A | 231.1 |
| Nonyl phenol | 44.0 |
| Benzyldimethylamine | 0.15 |
| 2-Ethylhexanol half-blocked IPDI | 496.0 |
| Ethylene glycol monobutyl ether | 503.4 |
| Methyl isobutyl diketimine-73% | 293.6 |
| MIBK solution of diethylenetriamine | |
| Deionized water | 360.0 |
| Ethylene glycol monobutyl ether | 1022.1 |

According to the above formulation, the reaction was conducted under the same reaction condition as that of Example 3 to give a cationic pigment dispersing resin, thereby affording a varnish F for pigment dispersion (resin solid content: 50%).

Example 7

| Component | Amount (parts by weight) |
| --- | --- |
| Epicoat 828 | 376.0 |
| Bisphenol A | 114.0 |
| Nonylphenol | 44.0 |
| Benzyldimethylamine | 0.15 |
| 2-Ethylhexanol half-blocked IPDI | 198.4 |
| Ethylene glycol monobutyl ether | 285.5 |
| Methyl isobutyl diketimine-73% | 293.6 |
| MIBK solution of diethylenetriamine | |
| Deionized water | 14.4 |
| Acetic acid anhydride | 40.8 |
| Ethylene glycol monobutyl ether | 468.8 |

According to the above formulation, the reaction was conducted under the same reaction condition as that of Example 3, before adding deionized water to reproduce primary amine group. Thereafter, the reaction mixture was cooled to 80° C. to which acetic acid anhydride was added dropwise over 30 minutes. After removing MIBK at a reduced pressure from the reaction mixture, it was diluted with ethylene glycol monobutyl ether to obtain a varnish G for pigment dispersion (resin solid content: 50%).

Comparative Example 1

| Component | Amount (parts by weight) |
| --- | --- |
| Epicoat 828 | 376.0 |
| Bisphenol A | 114.0 |
| Benzyldimethylamine | 0.15 |
| Ethylene glycol monobutyl ether | 209.8 |
| Methyl isobutyl monoketimine-78.8% | 236.0 |
| MIBK solution of aminoethyl ethanolamine | |
| Deionized water | 360.0 |
| Ethylene glycol monobutyl ether | 384.0 |

According to the above formulation, the reaction was conducted under the same reaction condition as that of Example 1 except that 2-ethylhexanol half blocked IPDI was not added to give a cationic pigment dispersing resin, thereby affording a varnish H for pigment dispersion (resin solid content: 50%).

Comparative Example 2

| Component | Amount (parts by weight) |
|---|---|
| Epicoat 828 | 376.0 |
| Bisphenol A | 114.0 |
| Nonyl phenol | 88.0 |
| Benzyldimethylamine | 0.15 |
| 2-Ethylhexanol half blocked IPDI | 198.4 |
| Ethylene glycol monobutyl ether | 304.3 |
| Methyl isobutyl monoketimine-78.8% MIBK solution of aminoethyl ethanolamine | 141.6 |
| Deionized water | 360.0 |
| Ethylene glycol monobutyl ether | 484.0 |

According to the above formulation, the reaction was conducted under the same reaction condition as that of Example 3 to give a cationic pigment dispersing resin, thereby affording a varnish I for pigment dispersion (resin solid content: 50%).

Comparative Example 3

| Component | Amount (parts by weight) |
|---|---|
| Epicoat 828 | 376.0 |
| Bisphenol A | 114.0 |
| Benzyldimethylamine | 0.15 |
| 2-Ethylhexanol half blocked IPDI | 198.4 |
| Ethylene glycol monobutyl ether | 266.6 |
| N-methyl ethanolamine | 75.1 |
| Ethylene glycol monobutyl ether | 457.2 |

According to the above formulation, the reaction was conducted under the same reaction condition as that of Example 1 except that N-methyl ethanolamine was used in place of methyl isobutyl monoketimine-78.8% MIBK solution of aminoethyl ethanolamine and the addition of deionized water and the process of concentration under reduced pressure were not conducted to give a cationic pigment dispersing resin, thereby affording a varnish J for pigment dispersion (resin solid content: 50%).

Comparative Example 4

Preparation of resin described in U.S. Pat. No. 4,007,154

(1) Preparation of quaternizing agent

| Component | Amount | Solid content |
|---|---|---|
| 2-Ethylhexanol half blocked TDI (in MIBK) | 320.0 | 304 |
| Dimethyl ethanolamine | 87.2 | 87.2 |
| Aqueous lactic acid solution | 117.6 | 88.2 |
| Ethylene glycol monobutyl ether | 39.2 | — |

According to the above formulation, 2-ethylhexanol half blocked TDI was added to dimethyl ethanolamine at room temperature using a suitable reaction vessel. The mixture generated heat, followed by stirring at 80° C. for one hour. Then, lactic acid and butyl cellosolve were charged and the reaction mixture was stirred at 65° C. for about half an hour to give a quaternizing agent.

(2) Preparation of resin vehicle

| Component | Amount | solid content |
|---|---|---|
| Epon 829[1] | 710.0 | 681.2 |
| Bisphenol A | 289.6 | 289.6 |
| 2-Ethylhexanol half blocked TDI (in MIBK) | 406.4 | 386.1 |
| Quaternizing agent of the item (1) | 496.3 | 421.9 |
| Deionized water | 71.2 | |
| Ethylene glycol monobutyl ether | 1584.1 | — |

[1]: Bisphenol A type epoxy resin having an epoxy equivalent of 193 to 203 manufactured by Shell Chemical Company.

According to the above formulation, EPON 829 and bisphenol A were charged in a suitable reaction vessel, which was heated to 150° to 160° C. under a nitrogen atmosphere. The initial exothermic reaction was arisen. The reaction mixture was reacted at 150° to 160° C. for about one hour and, after cooling to 120° C., 2-ethylhexanol half blocked TDI was added. The reaction mixture was maintained at 110° to 120° C. for about one hour and butyl cellosolve was added. Then, the mixture was cooled to 85° to 95° C. and homogenized, and the quaternizing agent of the item (1) was added. The reaction mixture was maintained at 85° to 95° C. until the acid value was 1 to give a varnish for pigment dispersion K (resin solid content: 50%).

TABLE 1

| | Example No. | | | | | | | Comparative Example No. | | | |
|---|---|---|---|---|---|---|---|---|---|---|---|
| | 1 | 2 | 3 | 4 | 5 | 6 | 7 | 1 | 2 | 3 | 4 |
| Equivalent of starting epoxy resin | 490 | 490 | 490 | 800 | 490 | 800 | 490 | 490 | 490 | 490 | 792 |
| Moles of half-blocked isocyanate added in one molecule | 1 pc | 1 pc | 2 pcs | 1 pc | 0.5 pc | 2.5 pcs | 1 ps | 0 pc | 1 pcs | 1 pcs | 1 pcs |
| SP value of hydrophobic epoxy resin | 10.6 | 10.6 | 10.4 | 10.4 | 11.0 | 10.1 | 10.6 | 11.6 | 10.6 | 10.6 | — |
| Equivalent of ketimine group formulated in one epoxy group | 1 pc | 2 pcs | 0.8 pc | 1.6 pcs | 1.6 pcs | 1.6 pcs | 0.8 pc | 1 pc | 0.6 pc | 0 pc | Quaternary ammonium |

It was measured by a turbidity method due to (1) water/hexane titration.

In Examples 8 to 14, the preparation of various pigment-dispersed pastes using varnishes for pigment dispersion obtained in Examples 1 to 7 and the preparation of various cationic electrodeposition paints using these pigment pastes will be described.

Example 8

The following component mixture was dispersed using a sand grind mixer to prepare a pulverized pigment-dispersed paste having a particle size of 10μ or less.

| Component | Amount (parts by weight) |
| --- | --- |
| Pigment-dispersed paste (Example 1) | 30.0 (solid content: 15.0 parts) |
| Deionized water | 71.9 |
| 50% Lactic acid | 3.5 |
| Carbon black | 1.8 |
| Kaolin | 20.0 |
| Lead silicate | 6.0 |
| Titanium dioxide | 72.2 |

This pigment-dispersed paste had a total solid content of 56.0%, a resin solid content of 7.3% and a pigment solid content of 48.7%.

Then, a cationic electrodeposition paint A was prepared according to the following formulation.

| Component | Amount (parts by weight) |
| --- | --- |
| Water dispersion A of main resin for cationic electrodeposition paint | 1979.2 |
| Pigment paste of this Example | 513.4 |
| Deionized water | 2507.4 |

A pigment paste was added to a water dispersion A of a main resin for cationic electrodeposition paint and, after mixing uniformly, deionized water was added to give a cationic electrodeposition paint A having a solid content of 20.0%. Storage stability of the cationic electrodeposition paint A with time was evaluated with the 380 mesh transmission and residual amount of an electrodeposition paint after storing with stirring at 40° C. for 2 weeks.

Then, the resulting electrodeposition paint A was electrodeposited on a cold-pressed steel plate which has been subjected to a zinc phosphate treatment in a thickness of 20μ and, after baking at 160° C. for 10 minutes, the steel plate was provided with a cut and dipped in a 5% NaCl solution at 55° C. for 240 hours. After an adhesive tape having a width of 2.4 cm (manufactured by Nichiban Co., Ltd.) was adhered securely on this sample with a finger, the adhesive tape was peeled off rapidly. Then, the seawater corrosion resistance of the electrodeposition paint A was evaluated by measuring the maximum peel width from the steel plate.

These evaluation results are shown in Table 2 together with the results obtained in Examples 9 to 14 and Comparative Examples 5 to 9 below.

Example 9

According to the same manner as that described in Example 8 except for using a pigment-dispersed varnish of Example 2 in place of a pigment-dispersed varnish of Example 1, a pigment-dispersed paste was prepared and a cationic electrodeposition paint B using the same was prepared.

Example 10

According to the same manner as that described in Example 8 except for using a pigment-dispersed varnish of Example 3 in place of a pigment-dispersed varnish of Example 1 and using 72.6 parts of deionized water, 2.8 parts of 50% lactic acid and a water dispersion B of a main resin for cationic electrodeposition paint, a pigment-dispersed liquid paste was prepared and a cationic electrodeposition paint C using the same was prepared.

Example 11

According to the same manner as that described in Example 8 except for using a pigment-dispersed varnish of Example 4 in place of a pigment-dispersed varnish of Example 1 and using 72.5 parts of deionized water and 2.9 parts of 50% lactic acid, a pigment-dispersed paste was prepared and a cationic electrodeposition paint D using the same was prepared.

Example 12

According to the same manner as that described in Example 8 except for using a pigment-dispersed varnish of Example 5 in place of a pigment-dispersed varnish of Example 1 and using 44.6 parts of a pigment-dispersed varnish, 73.5 parts of deionized water and 5.1 parts of 50% lactic acid, a pigment-dispersed paste (total solid content: 56.0%, resin solid content: 11.2%, pigment solid content: 44.8%) was prepared and a cationic electrodeposition paint E using the same was prepared.

| Component | Amount (parts by weight) |
| --- | --- |
| Water dispersion A of main resin for cationic electrodeposition paint | 1909.7 |
| Pigment paste of this Example | 558.0 |
| Deionized water | 2532.3 |

Example 13

According to the same manner as that described in Example 8 except for using a pigment-dispersed varnish of Example 6 in place of a pigment-dispersed varnish of Example 1 and using 89.3 parts of a pigment-dispersed varnish, 73.4 parts of deionized water and 5.2 parts of 50% lactic acid, a pigment-dispersed paste (total solid content: 56.0%, resin solid content: 18.7%, pigment solid content: 37.3%) was prepared and a cationic electrodeposition paint F using the same was prepared.

| Component | Amount (parts by weight) |
| --- | --- |
| Water dispersion A of main resin for cationic electrodeposition paint | 1736.1 |
| Pigment paste of this Example | 669.6 |
| Deionized water | 2594.3 |

Example 14

According to the same manner as that described in Example 7 except for using a pigment-dispersed paste of Example 7 instead of the pigment dispersing varnish of Example 1 and no use of 30 parts by weight of the pigment dispersing varnish, 75.4 parts by weight of deionized water and 50% lactic acid, a pigment dispersing paste having a total solid content of 56.0%, a resin solid content of 7.0% and a pigment content of 48.7% was prepared, and then a cationic electrodeposition paint G using the pigment dispersing paste was prepared.

Example 15

According to the same manner as that described in Example 8 except for using a pigment dispersed paste of Example 7 and an aqueous dispersion C for a cationic electrodeposition paint, a cationic electrodeposition paint G was prepared.

In Comparative Examples 5 to 9, the preparation of various pigment-dispersed pastes using pigment-dispersed varnishes of Comparative Examples 1 to 4 and the preparation of various cationic electrodeposition paints using these pigment pastes will be described.

Comparative Example 5

According to the same manner as that described in Example 8 except for using a pigment-dispersed varnish of Comparative Example 1 in place of a pigment-dispersed varnish of Example 1 and using 70.9 parts of deionized water and 4.5 parts of 50% lactic acid, a pigment-dispersed paste was prepared and a cationic electrodeposition paint H using the same was prepared.

Comparative Example 6

According to the same manner as that described in Example 8 except for using a pigment-dispersed varnish of Comparative Example 2 in place of a pigment-dispersed varnish of Example 1 and using 73.9 parts of deionized water and 2.0 parts of 50% lactic acid, a pigment-dispersed paste was prepared and a cationic electrodeposition paint 1 using the same was prepared.

Comparative Example 7

According to the same manner as that described in Example 8 except for using a pigment-dispersed varnish of Comparative Example 3 in place of a pigment-dispersed varnish of Example 1 and using 71.8 parts of deionized water and 3.6 parts of 50% lactic acid, a pigment-dispersed paste was prepared and a cationic electrodeposition paint J using the same was prepared.

Comparative Example 8

According to the same manner as that described in Example 8 except for using a pigment-dispersed varnish of Comparative Example 4 in place of a pigment-dispersed varnish of Example 1 and using 75.4 parts of deionized water and 0 parts of 50% lactic acid, a pigment-dispersed paste was prepared and a cationic electrodeposition paint K using the same was prepared.

Comparative Example 9

| Component | Amount (parts by weight) |
| --- | --- |
| Varnish A for pigment dispersion of Example 1 | 712.5 |
| Glacial acetic acid | 27.7 |
| Water dispersion A of main resin for cationic electrodeposition paint | 989.6 |
| Pigment paste of this Example 8 | 513.4 |
| Deionized water | 2756.8 |

According to the above formulation, a varnish A for pigment dispersion of Example 1 was mixed with glacial acetic acid uniformly and a water dispersion A of a main resin for cationic electrodeposition paint was added slowly to dissolve completely. To this were added a pigment paste and deionized water to give a cationic electrodeposition paint L having a solid content of 20.0%.

TABLE 2

| Example No. | Varnish for pigment dispersion used | Evaluation results of storage stability (mg) | Evaluation results of seawater corrosion resistance (mm) | Weight proportion of cationic pigment dispersing resin in paint solid content (%) |
| --- | --- | --- | --- | --- |
| Example 8 | A | 15 | 2.0 | 3.8 |
| Example 9 | B | 9 | 1.5 | 3.8 |
| Example 10 | C | 12 | 2.5 | 3.8 |
| Example 11 | D | 18 | 1.8 | 3.8 |
| Example 12 | E | 25 | 2.1 | 6.2 |
| Example 13 | F | 15 | 2.9 | 12.5 |
| Example 14 | G | 13 | 2.6 | 3.8 |
| Example 15 | A | 28 | 3.0 | 3.8 |
| Comparative Example 6 | I | 50 | 3.0 | 3.8 |
| Comparative Example 7 | J | Not less than 1000 | 3.8 | 3.8 |
| Comparative Example 8 | K | 35 | 6.5 | 3.8 |
| Comparative Example 9 | A | 11 | 4.8 | 39.4 |

(1) It was evaluated with the residual amount of an electrodeposition paint which was obtained by storing 2 liter of the electrodeposition paint with stirring at 40° C. for 2 weeks, followed by filtering with a 380 mesh net.

(2) Seawater corrosion resistance was measured for 240 hours. The data indicates the maximum peel width.

What is claimed is:

1. A cationic electrodeposition coating composition comprising:
   (A) a cationic resin;
   (B) a low-temperature dissociation blocked isocyanate curing agent wherein the curing agent has a low curing temperature of 160° C. or less; and
   (C) a pigment paste containing a pigment dispersed in a cationic pigment dispersing resin,
   wherein said cationic pigment grinding resin is prepared by introducing primary amino groups into a hydrophobic epoxy resin for pigment dispersion and neutralizing it with acid, said hydrophobic epoxy resin having a solubility..parameter (SP) value of 10.0 to 11.0, a number of amino groups in one molecule averaging 1.6 to 4.0 and an epoxy equivalent of 180 to 1,000 and wherein (A):(B):(C) is present in a weight ratio of 10 to 88:10 to 50:2 to 50 based on solid content of the coating composition.

2. The cationic electrodeposition coating composition according to claim 1, wherein the primary amino groups are introduced by reacting a partially ketimine-capped polyamine with an epoxy group in the hydrophobic epoxy resin.

3. The cationic electrodeposition coating composition according to claim 1 wherein the solubility parameter (SP) value of the hydrophobic epoxy resin is adjusted by adding an average of 0.5 to 2.5 moles of isocyanates in one molecule of said epoxy resin, wherein the amount of residue of said isocyanate in one molecule being 1.0 to 0.5 molar equivalent.

4. The cationic electrodeposition coating composition according to claim 1 wherein a portion of the primary amino groups of said hydrophobic epoxy resin is, reacted with an acid anhydride to form an amide group.

5. The cationic electrodeposition coating composition according to claim 4 wherein the number of amino groups in one molecule averages 1.0 to 3.0 and the number of amide groups in one molecule averages 1.2 to 2.4.

6. The cationic electrodeposition coating composition according to claim 1, wherein the cationic resin (A) is an amine-modified epoxy resin.

* * * * *

UNITED STATES PATENT AND TRADEMARK OFFICE
CERTIFICATE OF CORRECTION

PATENT NO. : 5,510,400
DATED : April 23, 1996
INVENTOR(S) : Hiroyuki KAGEYAMA et al.

It is certified that error appears in the above-identified patent and that said Letters Patent is hereby corrected as shown below:

Cover page, next to "[75] Inventors:", after "Itami;", kindly insert --Toshiaki Sakamoto, Hirakata;--.

Signed and Sealed this

Sixteenth Day of July, 1996

*Attest:*

BRUCE LEHMAN

*Attesting Officer*     *Commissioner of Patents and Trademarks*